(12) United States Patent
Wu

(10) Patent No.: US 11,632,359 B2
(45) Date of Patent: *Apr. 18, 2023

(54) DEVICE AND METHOD OF HANDLING MOBILE DATA TRANSMISSIONS IN A WIRELESS COMMUNICATION SYSTEM

(71) Applicant: HTC Corporation, Taoyuan (TW)

(72) Inventor: Chih-Hsiang Wu, Taoyuan (TW)

(73) Assignee: HTC Corporation, Taoyuan (TW)

( * ) Notice: Subject to any disclaimer, the term of this patent is extended or adjusted under 35 U.S.C. 154(b) by 116 days.

This patent is subject to a terminal disclaimer.

(21) Appl. No.: 17/322,888

(22) Filed: May 17, 2021

(65) Prior Publication Data

US 2021/0273925 A1  Sep. 2, 2021

Related U.S. Application Data

(63) Continuation of application No. 15/853,992, filed on Dec. 26, 2017, now Pat. No. 11,050,721.

(Continued)

(51) Int. Cl.
*H04L 9/40* (2022.01)
*H04L 9/32* (2006.01)
(Continued)

(52) U.S. Cl.
CPC .......... *H04L 63/0457* (2013.01); *H04L 9/32* (2013.01); *H04L 63/0485* (2013.01); *H04W 12/033* (2021.01); *H04W 80/02* (2013.01)

(58) Field of Classification Search
CPC ......... H04W 28/0268; H04W 28/0263; H04W 28/02; H04W 28/065; H04W 28/0289;
(Continued)

(56) References Cited

U.S. PATENT DOCUMENTS

| | | | |
|---|---|---|---|
| 2008/0056273 A1* | 3/2008 | Pelletier | H04L 67/04 370/395.21 |
| 2013/0046968 A1* | 2/2013 | Dinan | H04W 72/0413 713/150 |

(Continued)

OTHER PUBLICATIONS

3GPP TR 23.799 V1.1.0, Oct. 2016.

*Primary Examiner* — Tae K Kim
(74) *Attorney, Agent, or Firm* — Winston Hsu

(57) ABSTRACT

A first communication device for transmitting data to a second communication device comprises a storage device for storing instructions and a processing circuit coupled to the storage device. The processing circuit is configured to execute the instructions stored in the storage device. The instructions comprise compressing a first packet to a first compressed packet according to a compressor instance, wherein the first packet is associated to a flow identity (ID); generating a first Protocol Data Unit (PDU) comprising the flow ID and the first compressed packet; associating a first sequence number (SN) to the first PDU; encrypting the first PDU to a first encrypted packet; generating a first Packet Data Convergence Protocol (PDCP) PDU comprising the first SN and the first encrypted packet; and transmitting the first PDCP PDU via a first logical channel (LC) to the second communication device.

20 Claims, 11 Drawing Sheets

Related U.S. Application Data

(60) Provisional application No. 62/449,125, filed on Jan. 23, 2017, provisional application No. 62/439,129, filed on Dec. 26, 2016.

(51) Int. Cl.
*H04W 12/033* (2021.01)
*H04W 80/02* (2009.01)

(58) Field of Classification Search
CPC . H04W 28/06; H04W 28/0252; H04W 28/10; H04W 28/12; H04W 28/0257; H04W 28/0273; H04W 76/11; H04W 76/15; H04W 76/12; H04L 63/0485; H04L 47/10; H04L 47/2441; H04L 47/2483; H04L 47/621; H04L 47/6215; H04L 47/6295

See application file for complete search history.

(56) References Cited

U.S. PATENT DOCUMENTS

| | | | |
|---|---|---|---|
| 2014/0098761 A1* | 4/2014 | Lee | H04B 17/318 370/329 |
| 2015/0098332 A1* | 4/2015 | Eriksson | H04W 28/0263 370/235 |
| 2015/0146617 A1* | 5/2015 | Park | H04W 28/06 370/328 |
| 2015/0188680 A1* | 7/2015 | Li | H04L 5/0032 370/329 |
| 2015/0264562 A1* | 9/2015 | Wu | H04W 12/037 380/270 |
| 2015/0280905 A1* | 10/2015 | Shah | H04L 47/34 370/504 |
| 2016/0057650 A1* | 2/2016 | Uchino | H04W 72/1284 370/235 |
| 2016/0366175 A1* | 12/2016 | Basu Mallick | H04W 12/04 |
| 2017/0289841 A1* | 10/2017 | Koskinen | H04L 47/34 |
| 2017/0367007 A1* | 12/2017 | Sirotkin | H04W 28/06 |
| 2018/0013685 A1* | 1/2018 | Yu | H04L 43/0829 |
| 2018/0098241 A1* | 4/2018 | Callard | H04W 80/06 |
| 2018/0132135 A1* | 5/2018 | Shi | H04L 1/1607 |
| 2018/0146467 A1* | 5/2018 | Kim | H04W 80/02 |
| 2018/0167810 A1* | 6/2018 | Wu | H04L 63/0876 |
| 2018/0234839 A1* | 8/2018 | Tenny | H04W 12/10 |
| 2018/0368196 A1* | 12/2018 | Gage | H04W 74/006 |
| 2019/0028920 A1* | 1/2019 | Pan | H04L 47/24 |
| 2019/0098544 A1* | 3/2019 | Han | H04W 72/12 |
| 2019/0141550 A1* | 5/2019 | Yi | H04W 24/10 |
| 2019/0159071 A1* | 5/2019 | Yavuz | H04W 80/08 |
| 2019/0230667 A1* | 7/2019 | Loehr | H04W 8/02 |
| 2019/0245800 A1* | 8/2019 | Kim | H04W 28/06 |
| 2019/0306871 A1* | 10/2019 | Liu | H04L 1/18 |
| 2019/0349810 A1* | 11/2019 | Cho | H04W 28/06 |

* cited by examiner

DEVICE AND METHOD OF HANDLING MOBILE DATA TRANSMISSIONS IN A WIRELESS COMMUNICATION SYSTEM

CROSS REFERENCE TO RELATED APPLICATIONS

This is a continuation application of U.S. application Ser. No. 15/853,992 filed on Dec. 26, 2017, which claims the benefit of U.S. Provisional Applications No. 62/439,129, filed on Dec. 26, 2016, and No. 62/449,125, filed on Jan. 23, 2017.

BACKGROUND OF THE INVENTION

1. Field of the Invention

The present invention relates to a device and a method used in a wireless communication system, and more particularly, to a device and a method of handling mobile data transmissions in a wireless communication system.

2. Description of the Prior Art

A long-term evolution (LTE) system includes a carrier aggregation (CA), a Dual Connectivity (DC), a LTE transmission over an unlicensed spectrum (e.g., LTE-unlicensed (LTE-U) or licensed-assisted access (LAA)).

SUMMARY OF THE INVENTION

The present invention therefore provides a communication device and method for handling mobile data transmissions in a wireless communication system to solve the abovementioned problem.

A first communication device for transmitting data to a second communication device comprises a storage device for storing instructions and a processing circuit coupled to the storage device. The processing circuit is configured to execute the instructions stored in the storage device. The instructions comprise compressing a first packet to a first compressed packet according to a compressor instance, wherein the first packet is associated to a flow identity (ID); generating a first Protocol Data Unit (PDU) comprising the flow ID and the first compressed packet; associating a first sequence number (SN) to the first PDU; encrypting the first PDU to a first encrypted packet; generating a first Packet Data Convergence Protocol (PDCP) PDU comprising the first SN and the first encrypted packet; transmitting the first PDCP PDU via a first logical channel (LC) to the second communication device; compressing a second packet to a second compressed packet according to the compressor instance, wherein the second packet is associated to the flow ID; generating a second PDU comprising the flow ID and the second compressed packet; associating a second SN to the second PDU; encrypting the second PDU to a second encrypted packet; generating a second PDCP PDU comprising the second SN and the second encrypted packet; and transmitting the second PDCP PDU via a second LC to the second communication device.

A first communication device for transmitting data to a second communication device comprises a storage device for storing instructions and a processing circuit coupled to the storage device. The processing circuit is configured to execute the instructions stored in the storage device. The instructions comprise configuring a first bearer for communicating with the second communication device; configuring a first logical channel (LC) and a second LC which are associated to the first bearer for transmitting a plurality of Packet Data Convergence Protocol (PDCP) Protocol Data Units (PDUs) via the first bearer to the second communication device; associating a first sequence number (SN) to a first packet and a second SN to a second packet, wherein the first SN and the second SN are in a SN space; encrypting the first packet to a first encrypted packet according to an encryption key, a first bearer ID of the first bearer, a first length of the first packet and the first SN; encrypting the second packet to a second encrypted packet according to the encryption key, the first bearer ID, a second length of the second packet and the second SN; transmitting the first encrypted packet on the first LC to the second communication device; and transmitting the second encrypted packet on the second LC to the second communication device; wherein the first bearer and the second bearer share a PDCP SN space, wherein a size of the PDCP SN space depends on a length of a PDCP SN.

A first communication device for receiving data from a second communication device comprises a storage device for storing instructions and a processing circuit coupled to the storage device. The processing circuit is configured to execute the instructions stored in the storage device. The instructions comprise receiving a first logical channel (LC) identity (ID) identifying a first LC and receiving a first Packet Data Convergence Protocol (PDCP) Protocol Data Unit (PDU) comprising a first encrypted packet via the first LC, from the second communication device; receiving a second LC ID identifying a second LC and receiving a second PDCP PDU comprising a second encrypted packet via the second LC, from the second communication device; deriving a first bearer ID from the first LC ID and deriving a second bearer ID from the second LC ID; decrypting the first encrypted packet to a first packet according to an encryption key, a first sequence number (SN) of the first encrypted packet, the first bearer ID, a first length of the first encrypted packet, a 1-bit transmission of direction and a first COUNT value; and decrypting the second encrypted packet to a second packet according to the encryption key, a second SN of the second encrypted packet, the second bearer ID, a second length of the second encrypted packet, the 1-bit transmission of direction and a second COUNT value; wherein the first bearer and the second bearer share a PDCP SN space, wherein a size of the PDCP SN space depends on a length of a PDCP SN.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
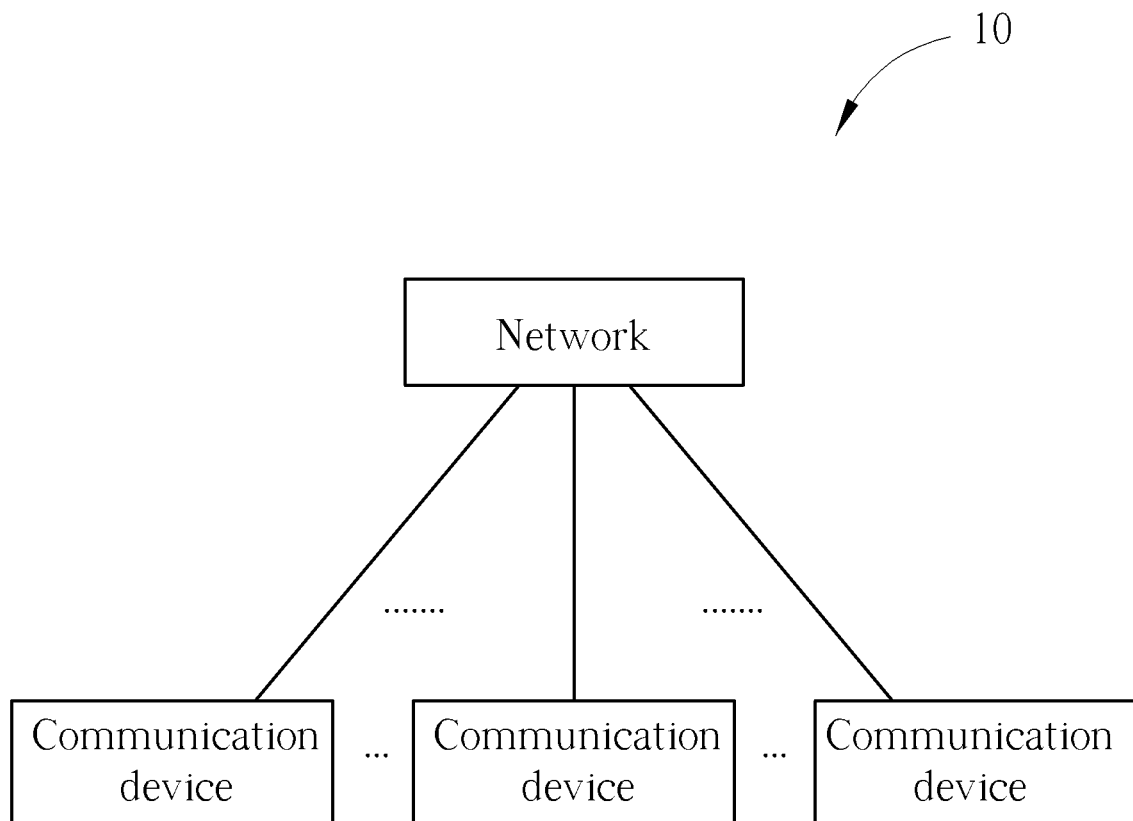
FIG. 1 is a schematic diagram of a wireless communication system according to an example of the present invention.

FIG. 1 is a schematic diagram of a wireless communication system 10 according to an example of the present invention. The wireless communication system 10 is briefly composed of a network and a plurality of communication devices. The network and a communication device may communicate with each other via one or more carriers of licensed band(s) and/or unlicensed band(s). The network and the communication device may simultaneously communicate with each other via one or multiple cells (e.g., one or multiple carriers) belonging to one or multiple base station (BS). The abovementioned cells may be operated in the same or different duplexing modes, i.e., frequency-division duplexing (FDD), time-division duplexing (TDD) and flexible duplexing.

In FIG. 1, the network and the communication devices are simply utilized for illustrating the structure of the wireless communication system 10. Practically, the network may be an evolved universal terrestrial radio access network (E-UTRAN) including at least one evolved Node-B (eNB). The network may be a fifth generation (5G) network including at least one 5G BS (e.g., gNB) which employs orthogonal frequency-division multiplexing (OFDM) and/or non-OFDM and a transmission time interval (TTI) shorter than 1 ms (e.g., 100 or 200 microseconds), to communicate with the communication devices, and supports a wider system bandwidth for communicating between the communication devices and the BS.

A communication device may be a user equipment (UE), a mobile phone, a laptop, a tablet computer, an electronic book, a portable computer system, a vehicle, a ship or an aircraft. In addition, the network and the communication device can be seen as a transmitter or a receiver according to direction (i.e., transmission direction), e.g., for an uplink (UL), the communication device is the transmitter and the network is the receiver, and for a downlink (DL), the network is the transmitter and the communication device is the receiver.

Figure 2:
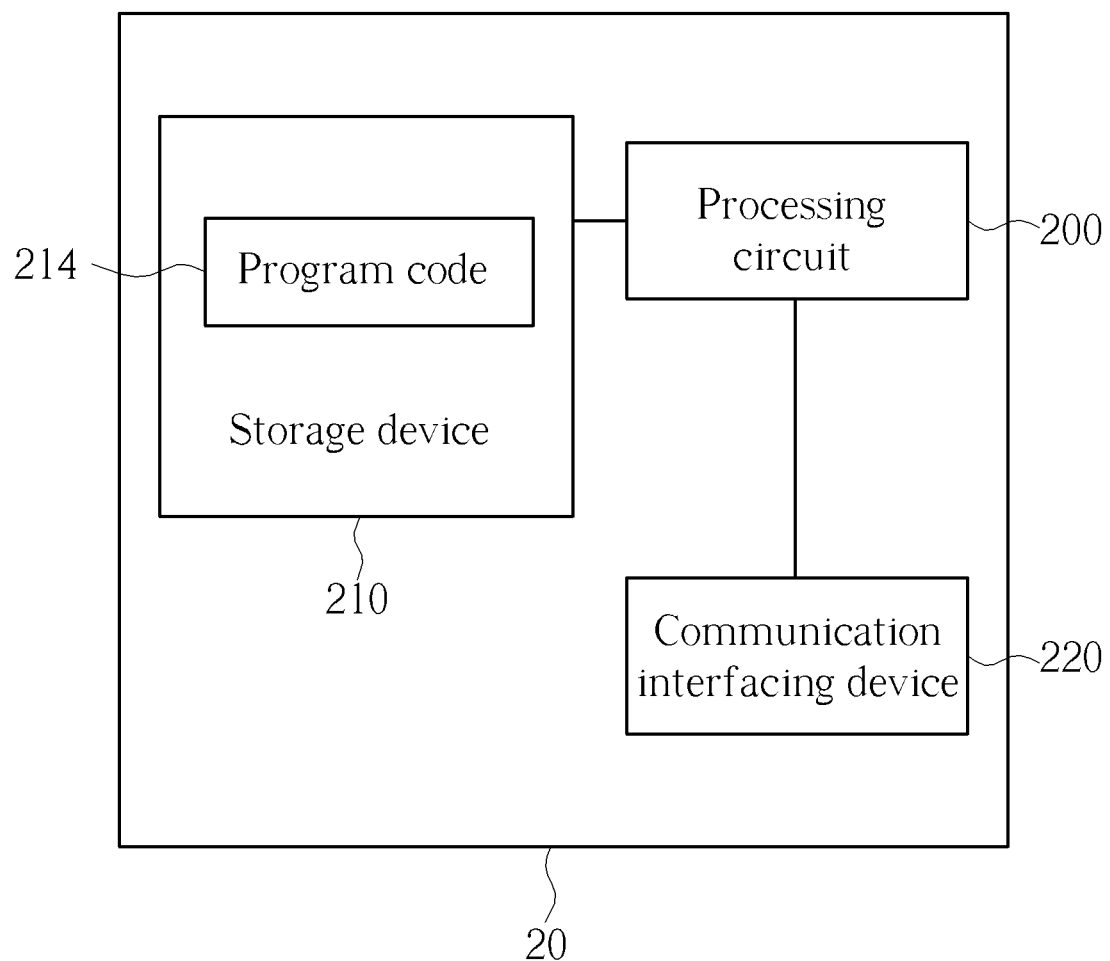
FIG. 2 is a schematic diagram of a communication device according to an example of the present invention.

FIG. 2 is a schematic diagram of a communication device 20 according to an example of the present invention. The communication device 20 may be a communication device or the network shown in FIG. 1, but is not limited herein. The communication device 20 may include a processing circuit 200 such as a microprocessor or Application Specific Integrated Circuit (ASIC), a storage device 210 and a communication interfacing device 220. The storage device 210 may be any data storage device that may store a program code 214, accessed and executed by the processing circuit 200. Examples of the storage device 210 include but are not limited to a subscriber identity module (SIM), read-only memory (ROM), flash memory, random-access memory (RAM), hard disk, optical data storage device, non-volatile storage device, non-transitory computer-readable medium (e.g., tangible media), etc. The communication interfacing device 220 includes at least one transceiver and is used to transmit and receive signals (e.g., data, messages and/or packets) according to processing results of the processing circuit 200.

In the following examples, a UE is used to represent a communication device in FIG. 1, to simplify the illustration of the embodiments.

Figure 3:
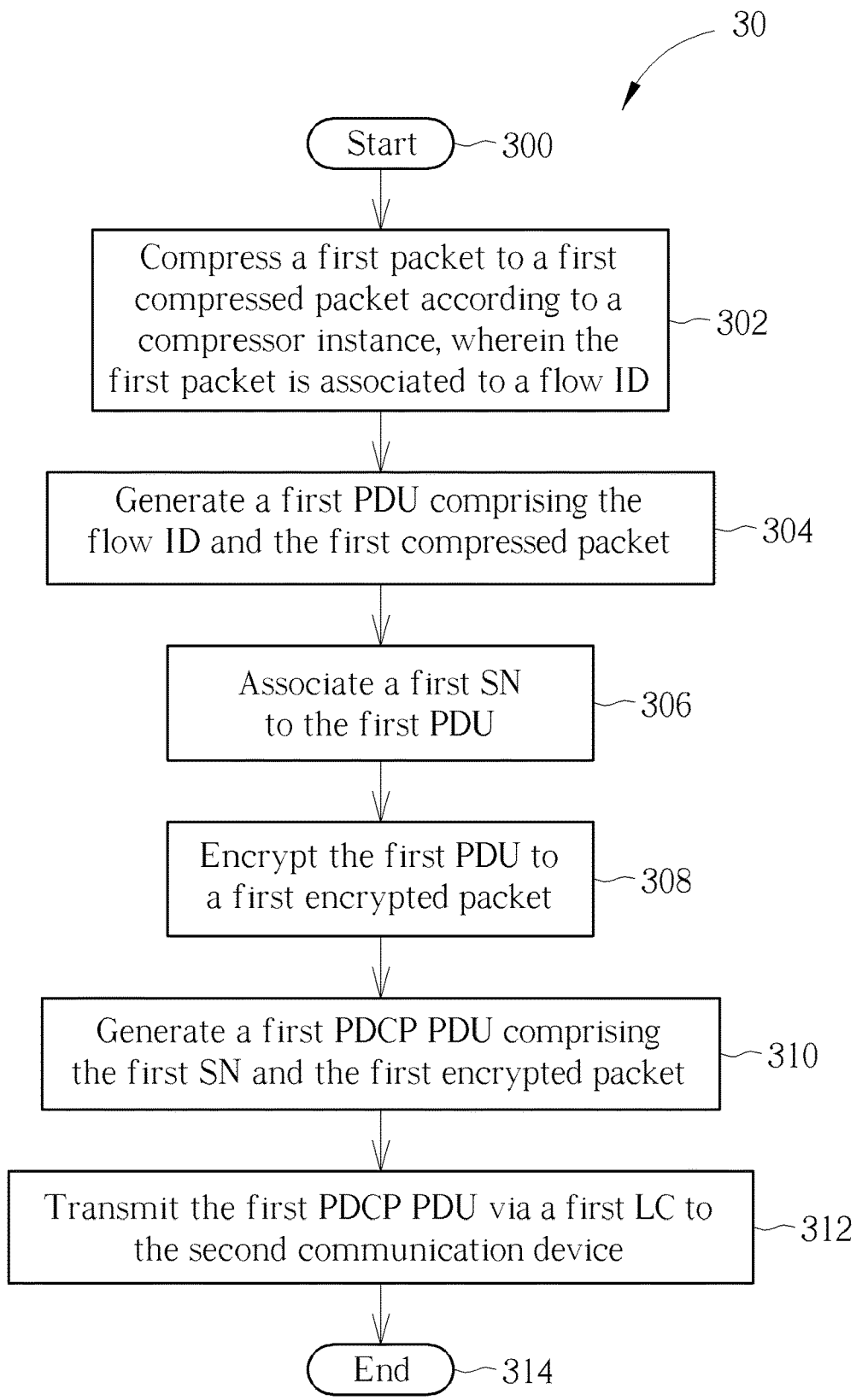
FIG. 3 is a flowchart of a process according to an example of the present invention.

FIG. 3 is a flowchart of a process 30 according to an example of the present invention. The process 30 is utilized in a first communication device, to transmit data to a second communication device, and includes the following steps:

Step 300: Start.

Step 302: Compress a first packet to a first compressed packet according to a compressor instance, wherein the first packet is associated to a flow identity (ID).

Step 304: Generate a first Protocol Data Unit (PDU) comprising the flow ID and the first compressed packet.

Step 306: Associate a first sequence number (SN) to the first PDU.

Step 308: Encrypt the first PDU to a first encrypted packet.

Step 310: Generate a first Packet Data Convergence Protocol (PDCP) PDU comprising the first SN and the first encrypted packet.

Step 312: Transmit the first PDCP PDU via a first logical channel (LC) to the second communication device.

Step 314: End.

According to the process 30, the first communication device compresses a packet but does not compress a flow ID.

Realization of the process 30 is not limited to the above description. The following examples may be applied to the process 30.

In one example, the first communication device compresses the first packet by compressing a header of the first packet according to a robust header compression protocol (ROHC). In one example, the first communication device compresses the first packet, a data field of the first packet or a payload of the first packet, according to a data compression protocol.

In one example, the first communication device performs Step 302 and/or 304 according to a transmitting entity of a new access stratum (AS) protocol layer (e.g., named Packet Data Association Protocol) above a PDCP layer or of the PDCP layer. In one example, the first communication device performs Steps 306-310 according to a transmitting entity of the PDCP layer. In one example, the first communication device performs Step 312 according to a Radio Link Control (RLC) entity.

In one example, the first communication device compresses a second packet to a second compressed packet according to (e.g., by using) the compressor instance, wherein the second packet is associated to the flow ID. The first communication device generates a second PDU (e.g., a second PDCP Service Data Unit (SDU)) including the flow ID and the second compressed packet. The first communication device associates a second SN to the second PDU. The first communication device encrypts the second PDU to a second encrypted packet. The first communication device generates a second PDCP PDU including the second SN (e.g., in a header of the second PDCP PDU) and the second encrypted packet (e.g., in a data field of the second PDCP PDU). The first communication device transmits the second PDCP PDU via a second LC to the second communication device.

In one example, the first communication device encrypts the first PDU (e.g., a first PDCP SDU) to the first encrypted packet and the second PDU (e.g., the second PDCP SDU) to the second encrypted packet according to (e.g., by using) the same transmitting PDCP entity. In one example, the first communication device encrypts the first PDU to the first encrypted packet according to a first transmitting PDCP entity and the second PDU to the second encrypted packet according to a second transmitting PDCP entity.

In one example, the second communication device receives the first PDCP PDU from the first communication device. Then, the second communication device removes a first PDCP header of the first PDCP PDU, to get the first PDCP SDU. The second communication device decrypts the first PDCP SDU to the first PDU and removes a first header of the first PDU, to get the first compressed packet, wherein the first header comprises the flow ID. Thus, the second communication device decompresses the first compressed packet to the first packet according to a decompressor instance. That is, the second communication device removes a header including a flow ID before decompressing a compressed packet. In other words, the flow ID is not compressed.

In one example, the second communication device receives the second PDCP PDU from the second communication device. The second communication device removes a second PDCP header of the second PDCP PDU, to get the second PDCP SDU. The second communication device decrypts the second PDCP SDU to the second PDU. The second communication device removes a second header of the second PDU, to get the second compressed packet, wherein the second header includes the flow ID. The second communication device decompresses the second compressed packet to the second packet according to the decompressor instance. The second communication device receives the first PDCP PDU via the first LC from the first communication device and the second PDCP PDU via the second LC from the first communication device.

In one example, the second communication device decompresses a first header of the first compressed packet or a second header of the second compressed packet according to the ROHC. In one example, the second communication device decompresses a data field (or payload) of the first compressed packet or a data field (or payload) of the second compressed packet according to the data compression protocol.

Figure 4:
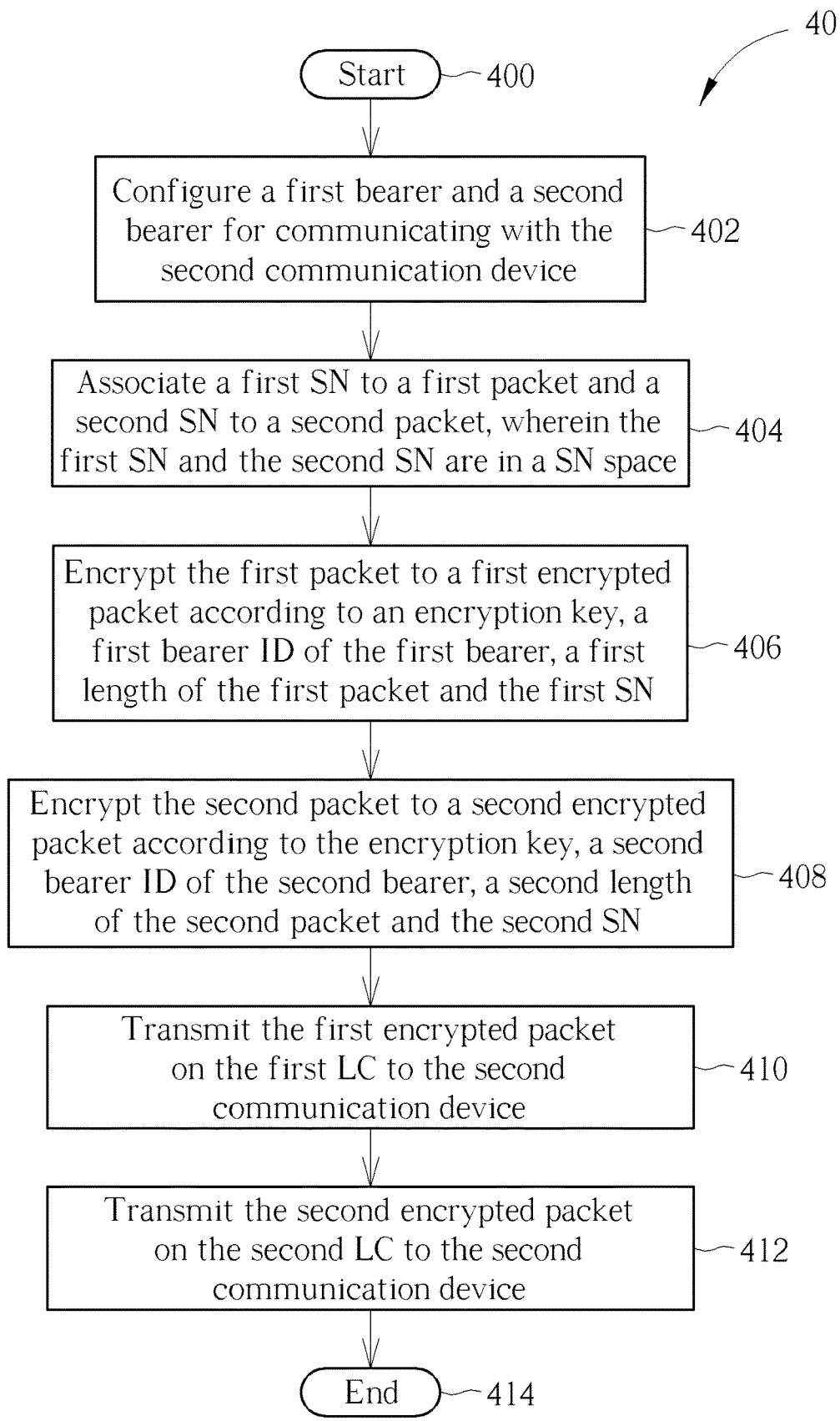
FIG. 4 is a flowchart of a process according to an example of the present invention.

FIG. 4 is a flowchart of a process 40 according to an example of the present invention. The process 40 is utilized in a first communication device, to transmit data to a second communication device and includes the following steps:

Step 400: Start.

Step 402: Configure a first bearer and a second bearer for communicating with the second communication device.

Step 404: Associate a first SN to a first packet and a second SN to a second packet, wherein the first SN and the second SN are in a SN space.

Step 406: Encrypt the first packet to a first encrypted packet according to an encryption key, a first bearer ID of the first bearer, a first length of the first packet and the first SN.

Step 408: Encrypt the second packet to a second encrypted packet according to the encryption key, a second bearer ID of the second bearer, a second length of the second packet and the second SN.

Step 410: Transmit the first encrypted packet on the first LC to the second communication device.

Step 412: Transmit the second encrypted packet on the second LC to the second communication device.

Step 414: End.

Realization of the process 40 is not limited to the above description. The following examples may be applied to the process 40.

In one example, the first communication device encrypts the first packet to the first encrypted packet according to a 1-bit transmission of direction (i.e., a DIRECTION bit) and a first COUNT value. The first COUNT value consists of a first hyper frame number (HFN) and the first SN. The first communication device encrypts the second packet to the second encrypted packet according to the 1-bit transmission of direction and a second COUNT value. The second COUNT value consists of a second HFN and the second SN. In one example, the DIRECTION bit is "0" for an UL and "1" for a DL. In one example, the first HFN and the second HFN may be same or different.

In one example, a transmitting PDCP entity of the first communication device maintains a variable TX_HFN for a first plurality of packets (including the first packet) transmitted on the first bearer and a second plurality of packets (including the second packet) transmitted on the second bearer, when the first bearer and the second bearer are associated to the transmitting PDCP entity. For example, the transmitting PDCP entity sets the first HFN and the second HFN to the variable TX_HFN.

In one example, a first transmitting PDCP entity of the first communication device maintains a first variable TX_HFN for a first plurality of packets (including the first packet) transmitted on the first bearer and a second transmitting PDCP entity of the first communication device maintains a second variable TX_HFN for a second plurality of packets (including the second packet) transmitted on the second bearer, when the first bearer and the second bearer are associated to the first transmitting PDCP entity and the second transmitting PDCP entity, respectively. For example, the first transmitting PDCP entity sets the first and second HFNs to the first and second variable TX_HFNs respectively.

In one example, the first bearer and the second bearer share a PDCP SN space. That is, the first SN and the second SN are in the PDCP SN space. In one example, a size of the PDCP SN space depends on a third length of a PDCP SN. For example, the PDCP SN space has SNs 0, 1, 2, . . . , 4095, when the third length of the PDCP SN is 12 bits. In one example, the first bearer and the second bearer are associated to the first transmitting PDCP entity of the first communication device, to share the same PDCP SN space. In one example, at an establishment of the first transmitting PDCP entity, the UE sets a variable TX_HFN to an initial value (e.g., 0). The first communication device maintains (or uses) the variable TX_HFN to set the first and second HFNs.

In one example, the first communication device generates the first SN and the second SN according to (e.g. by using) a first variable Next_PDCP_TX_SN indicating a PDCP SN of the next PDCP SDU. At the establishment of the first transmitting PDCP entity, the UE sets the first variable Next_PDCP_TX_SN to an initial value (e.g., 0). When setting a SN associated to an encrypted packet to the first variable Next_PDCP_TX_SN, the first transmitting PDCP entity increments the first variable Next_PDCP_TX_SN by one. In one example, the first transmitting PDCP entity sets the first SN to the first variable Next_PDCP_TX_SN and increments the first variable Next_PDCP_TX_SN. The first transmitting PDCP entity sets the second SN to the first variable Next_PDCP_TX_SN, when the second encrypted packet is the next PDCP SDU to be transmitted after the first encrypted packet.

In one example, the first transmitting PDCP entity of the first communication device maintains the first variable Next_PDCP_TX_SN for a third plurality of packets transmitted on the first bearer and the second bearer, when the first bearer and the second bearer are associated to the first transmitting PDCP entity.

Figure 5:
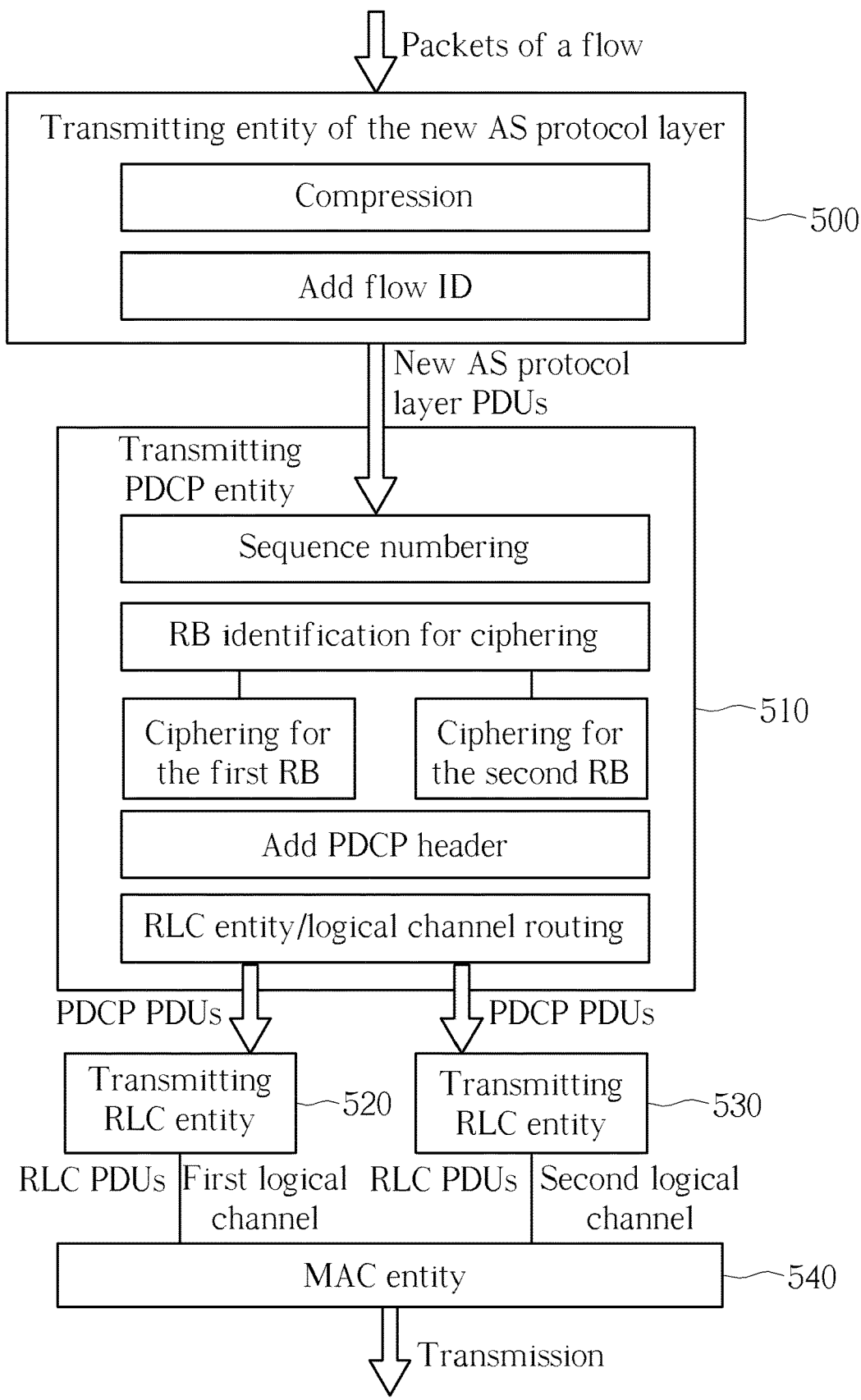
FIG. 5 is a schematic diagram of a data transmission in a layer 2 protocol architecture according to an example of the present invention.

FIG. 5 is a schematic diagram of a data transmission in a layer 2 protocol architecture according to an example of the present invention. After receiving a packet of a flow, a transmitting entity of a new AS protocol layer 500 compresses the packet to a compressed packet and adds a flow ID. The transmitting entity of the new AS protocol layer 500 generates a new AS protocol layer PUD including the compressed packet and the flow ID. Then, the transmitting entity of the new AS protocol layer 500 delivers the new AS protocol layer PUD to a transmitting PDCP entity 510. The transmitting PDCP entity 510 is associated to the first bearer and the second bearer. The transmitting PDCP entity 50 includes functions of "sequence numbering", "header compression", "radio bearer (RB) identification for ciphering", "RB-based ciphering", "add PDCP header" and "RLC entity/logical channel routing".

For example, when the transmitting PDCP entity 510 receives a first packet and a second packet from the transmitting entity of the new AS protocol layer 500, the function of "sequence numbering" assigns/associates a first SN and a second PDCP SN to the first packet and the second packet, respectively. The transmitting PDCP entity 510 respectively compresses a header (e.g., Internet Protocol (IP), User Datagram Protocol (UDP)/IP, Transmission Control Protocol (TCP)/IP, Real-time Transport Protocol (RTP)/UDP/IP, or Encapsulating Security Payload (ESP)/IP) of each of the first packet and the second packet according to the function of "header compression" to a first compressed packet and a second compressed packet, if the header compression is configured by the network. The function of "RB identification" indicates a first bearer ID to the function of "RB-based ciphering" for the first compressed packet, and the function of "RB-based ciphering" encrypts the first compressed packet according to the first bearer ID. The function of "RB identification" indicates a second bearer ID to the function of "RB-based ciphering" for a second compressed packet, and the function of "RB-based ciphering" encrypts the second compressed packet according to the second bearer ID. The function of "add PDCP header" generates a first header, and includes a first PDCP SN in the first header. Then, the transmitting PDCP entity 510 constructs a first PDCP PDU which includes the first header and the first (e.g., encrypted) packet in a first data field of the first PDCP PDU. The function of "add PDCP header" generates a second header, and includes a second PDCP SN in the second header. The transmitting PDCP entity 510 constructs a second PDCP PDU which includes the second header and the second (e.g., encrypted) packet in a second data field of the second PDCP PDU. The function of "RLC entity/logical channel routing" delivers the first PDCP PDU to a first RLC entity which has a first LC, and delivers the second PDCP PDU to a second RLC entity which has a second LC. The first LC is identified by a first LC ID. The second LC is identified by a second LC ID. The first LC ID, the second LC ID and the associations are configured by the network.

The transmitting RLC entity 520 may or may not segment the first PDCP PDU. The transmitting RLC entity 520 constructs a first RLC PDU which includes the header and includes the first PDCP PDU or a segment of the first PDCP PDU. The transmitting RLC entity 520 delivers the first RLC PDU to a Medium Access Control (MAC) entity 540 via a first LC. When receiving a second PDCP PDU from the transmitting PDCP entity 510, a transmitting RLC entity 530 may or may not segment the second PDCP PDU. The transmitting RLC entity 530 constructs a second RLC PDU which includes the header and includes the second PDCP PDU or a segment of the second PDCP PDU. The transmitting RLC entity 530 delivers the second RLC PDU to the MAC entity 540 via the second LC. The first PDCP PDU and the second PDCP PDU may be same or different.

In one example, a MAC entity of the first communication device transmits a first MAC PDU including the first LC ID and the first RLC PDU to the second communication device. The MAC entity transmits a second MAC PDU including the second LC ID and the second RLC PDU to the second communication device. In one example, the first MAC PDU and the second MAC PDU may be the same MAC PDU or different MAC PDUs.

Figure 6:
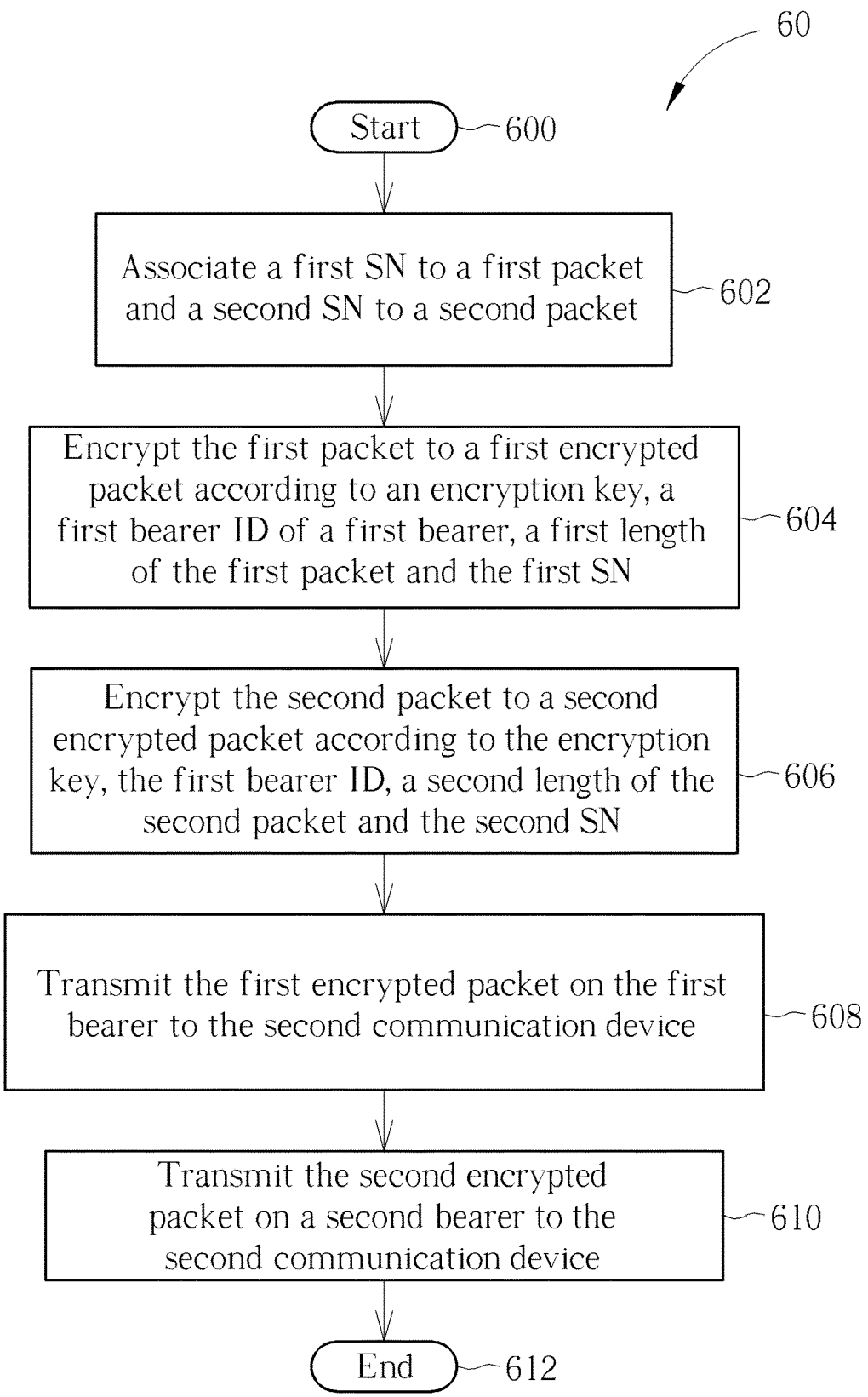
FIG. 6 is a flowchart of a process according to an example of the present invention.

FIG. 6 is a flowchart of a process 60 according to an example of the present invention. The process 60 is utilized in a first communication device, to transmit data to a second communication device and includes the following steps:

Step 600: Start.

Step 602: Associate a first SN to a first packet and a second SN to a second packet.

Step 604: Encrypt the first packet to a first encrypted packet according to an encryption key, a first bearer ID of a first bearer, a first length of the first packet and the first SN.

Step 606: Encrypt the second packet to a second encrypted packet according to the encryption key, the first bearer ID, a second length of the second packet and the second SN.

Step 608: Transmit the first encrypted packet on the first bearer to the second communication device.

Step 610: Transmit the second encrypted packet on a second bearer to the second communication device.

Step 612: End.

According to the process 60, two packets sent via different LCs are encrypted according to the same bearer ID. The two packets may be same or different.

In one example, the first communication device configures a first bearer and a second bearer for communicating with the second communication device. Thus, a packet (e.g., the second packet) may be encrypted according to a bearer ID of a bearer but transmitted on another bearer.

Realization of the process 60 is not limited to the above description. The following examples may be applied to the process 60.

Figure 7:
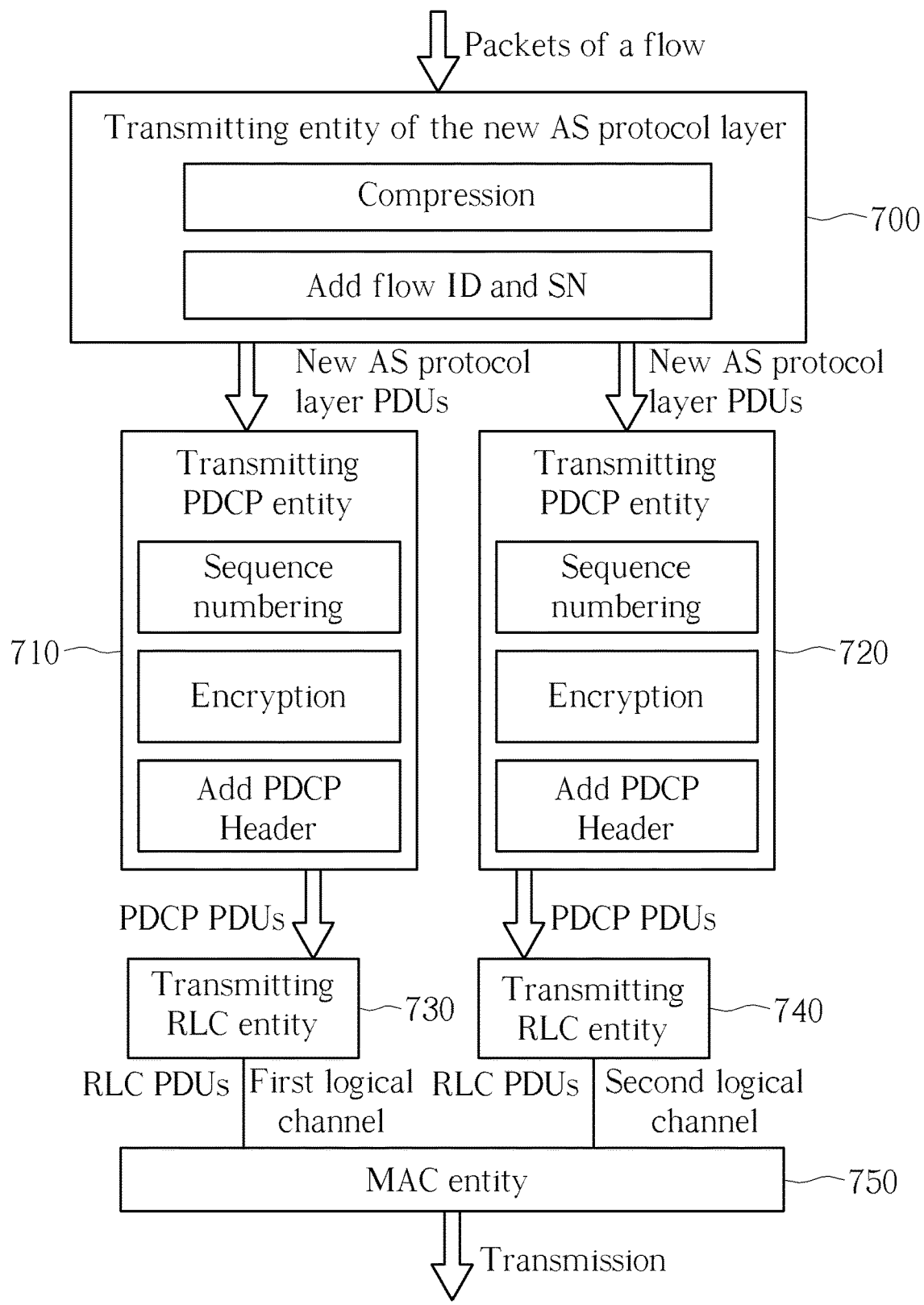
FIG. 7 is a schematic diagram of a data transmission in a layer 2 protocol architecture according to an example of the present invention.

FIG. 7 is a schematic diagram of a data transmission in a layer 2 protocol architecture according to an example of the present invention. The process 60 may be implemented in two transmitting PDCP entities as shown in FIG. 7. In this case, the first SN is assigned by a transmitting PDCP entity 710 of the transmitting PDCP entities, and the second SN is assigned by a transmitting PDCP entity 720 of the transmitting PDCP entities. That is, the first SN is in a first SN space of the transmitting PDCP entity 710, and the second SN is in a second SN space of the PDCP transmitting PDCP entity 720. In other words, each PDCP transmitting entity is only associated to a corresponding bearer. Data transmitted over the bearer will go through the associated transmitting PDCP entity.

Figure 8:
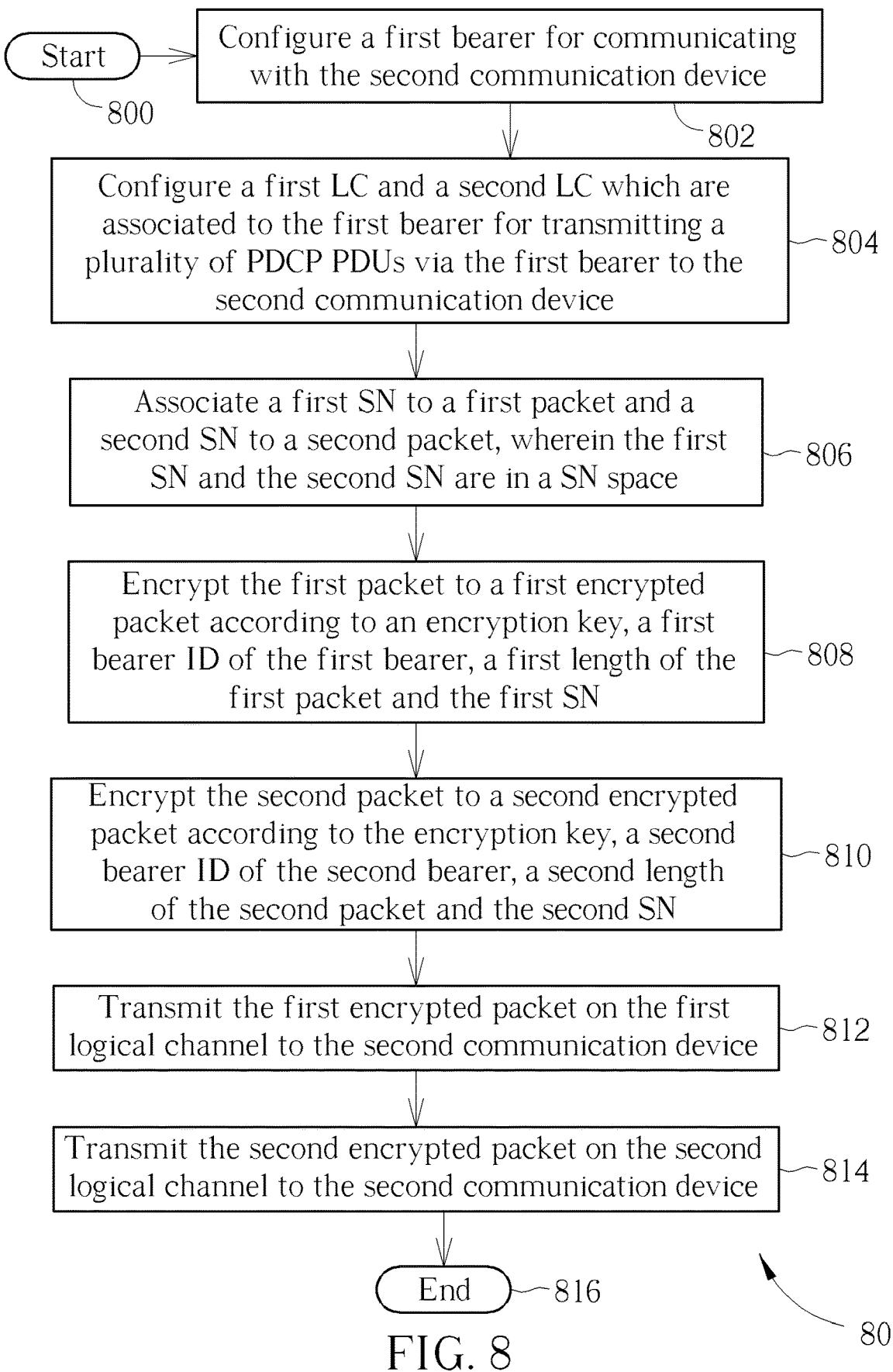
FIG. 8 is a flowchart of a process according to an example of the present invention.

FIG. 8 is a flowchart of a process 80 according to an example of the present invention. The process 80 is utilized in a first communication device, to transmit data to a second communication device and includes the following steps:

Step 800: Start.

Step 802: Configure a first bearer for communicating with the second communication device.

Step 804: Configure a first LC and a second LC which are associated to the first bearer for transmitting a plurality of PDCP PDUs via the first bearer to the second communication device.

Step 806: Associate a first SN to a first packet and a second SN to a second packet, wherein the first SN and the second SN are in a SN space.

Step 808: Encrypt the first packet to a first encrypted packet according to an encryption key, a first bearer ID of the first bearer, a first length of the first packet and the first SN.

Step 810: Encrypt the second packet to a second encrypted packet according to the encryption key, a second bearer ID of the second bearer, a second length of the second packet and the second SN.

Step 812: Transmit the first encrypted packet on the first LC to the second communication device.

Step 814: Transmit the second encrypted packet on the second LC to the second communication device.

Step 816: End.

According to the process 80, two LCs are associated to the same bearer, and two packets are encrypted according to the same bearer ID.

Realization of the process 80 is not limited to the above description. The following examples may be applied to the process 80.

The examples of the process 40 may be modified and applied to the process 80, and are not narrated herein.

Figure 9:
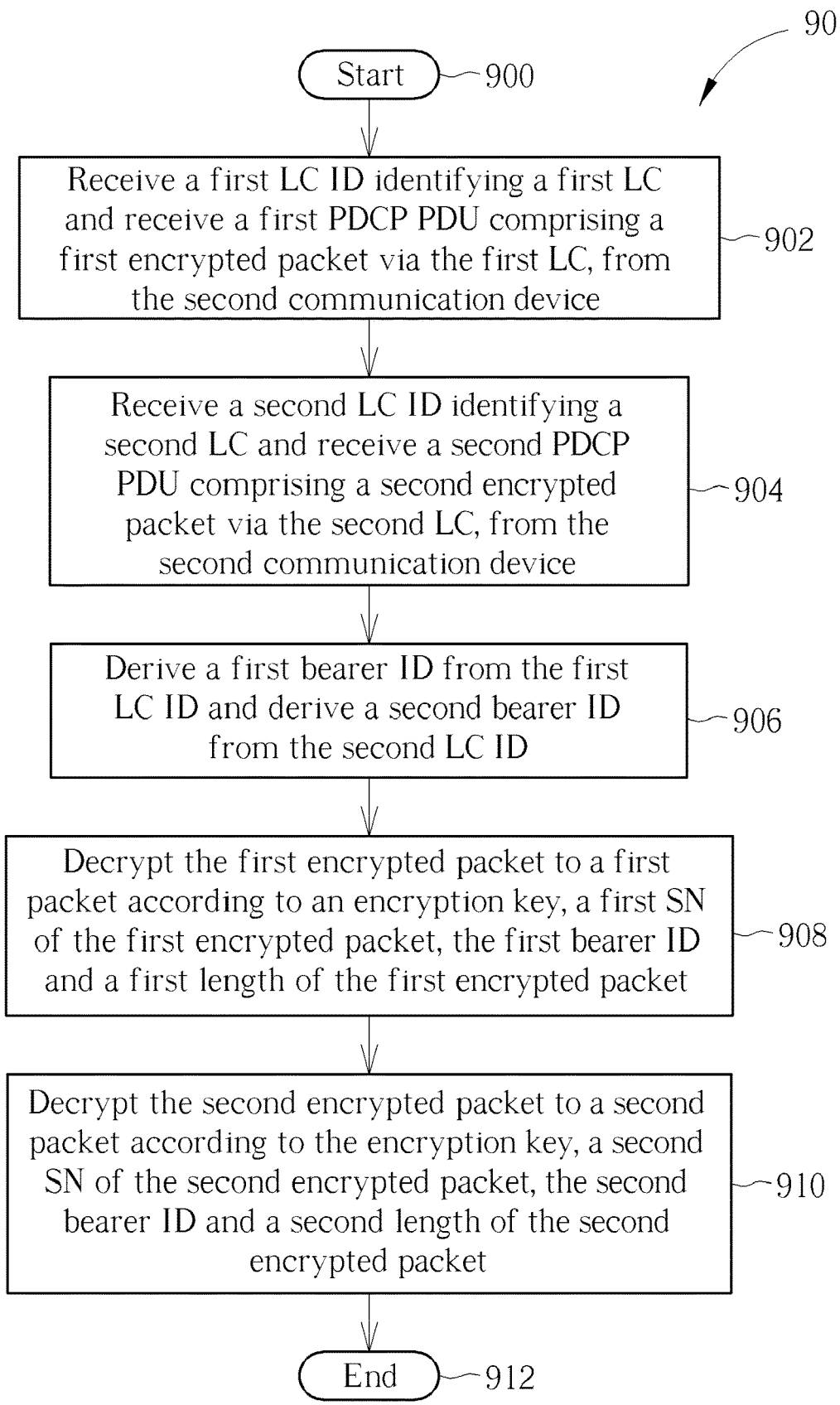
FIG. 9 is a flowchart of a process according to an example of the present invention.

FIG. 9 is a flowchart of a process 90 according to an example of the present invention. The process 90 is utilized in a first communication device, to receive data from a second communication device and includes the following steps:

Step 900: Start.

Step 902: Receive a first LC ID identifying a first LC and receive a first PDCP PDU comprising a first encrypted packet via the first LC, from the second communication device.

Step 904: Receive a second LC ID identifying a second LC and receive a second PDCP PDU comprising a second encrypted packet via the second LC, from the second communication device.

Step 906: Derive a first bearer ID from the first LC ID and derive a second bearer ID from the second LC ID.

Step 908: Decrypt the first encrypted packet to a first packet according to an encryption key, a first SN of the first encrypted packet, the first bearer ID and a first length of the first encrypted packet.

Step 910: Decrypt the second encrypted packet to a second packet according to the encryption key, a second SN of the second encrypted packet, the second bearer ID and a second length of the second encrypted packet.

Step 912: End.

According to the process 90, a bearer ID is derived according to a LC ID, and an encrypted packet is decrypted according to the bearer ID.

Realization of the process 90 is not limited to the above description. The following examples may be applied to the process 90.

In one example, the first communication device configures a first bearer identified by the first bearer ID and a second bearer identified by a second bearer ID for communicating with the second communication device. The first communication device configures the first LC identified by the first LC ID and associated to the first bearer. The first communication device configures the second LC identified by the second LC ID and associated to the second bearer. In one example, the first communication device configures the first bearer identified by the first bearer ID for communicating with the second communication device and configures the first LC and the second LC associated to the first bearer.

In one example, the first communication device receives the first encrypted packet via the first LC and the second encrypted packet via the second LC. The first encrypted packet and the second encrypted packet may be same or different. The first LC ID and the second LC ID are different. The first PDCP PDU and the second PDCP PDU may be same or different. The first SN is included in a header of the first PDCP PDU and the second SN is included in a header of the second PDCP PDU.

In one example, the first communication device decrypts the first encrypted packet to the first packet according to a 1-bit transmission of direction (i.e., a DIRECTION bit) and a first COUNT value. The first COUNT value consists of a first HFN and the first SN. The first communication device decrypts the second encrypted packet to the second packet according to the 1-bit transmission of direction and a second COUNT value. The second COUNT value consists of a second HFN and the second SN. In one example, the DIRECTION bit is 0 for an UL and 1 for a DL. In one example, the first HFN and the second HFN may be same or different.

In one example, the first communication device maintains (or uses) a variable RX_HFN indicating the first HFN or the second HFN for generation of the first COUNT value or the second COUNT value.

In one example, a receiving PDCP entity of the first communication device maintains a variable RX_HFN for a first plurality of encrypted packets (including the first encrypted packet) received on the first bearer and a second plurality of encrypted packets (including the second encrypted packet) received on the second bearer, when the first bearer and the second bearer are associated to the receiving PDCP entity.

In one example, a first receiving PDCP entity of the first communication device maintains a first variable RX_HFN for a first plurality of encrypted packets received on the first bearer and a second receiving PDCP entity of the first communication device maintains a second variable RX_HFN for a second plurality of encrypted packets received on the second bearer, when the first bearer and the second bearer are associated to the first receiving PDCP entity and the second receiving PDCP entity, respectively.

In one example, the first bearer and the second bearer share a PDCP SN space. In one example, a size of the PDCP SN space depends on a length of a PDCP SN. For example, the PDCP SN space has SNs 0, 1, 2, . . . , 4095, when the third length of the PDCP SN is 12 bits. In one example, the first bearer and the second bearer is associated to the receiving PDCP entity of the first communication device, to share the same PDCP SN space. In one example, at an establishment of the receiving PDCP entity (e.g. described above), the UE sets a variable RX_HFN (maintained by the receiving PDCP entity) to an initial value (e.g., 0).

In one example, a (first/second) variable Next_PDCP_RX_SN indicates a next expected PDCP SN (e.g., the first SN or the second SN) to be received by the (first/second) receiving PDCP entity. At the establishment of the (first/second) receiving PDCP entity, the first communication device sets the (first/second) variable Next_PDCP_RX_SN to an initial value (e.g., 0). When receiving an encrypted packet (i.e., PDCP SDU) associated to the next expected PDCP SN, the (first/second) receiving PDCP entity increments the (first/second) variable Next_PDCP_RX_SN by one.

In one example, the receiving PDCP entity of the first communication device maintains the first variable Next_PDCP_RX_SN for a first plurality of encrypted packets received on the first bearer and the second bearer, when the first bearer and the second bearer are associated to the receiving PDCP entity.

In one example, the first receiving PDCP entity of the first communication device maintains a first variable Next_PDCP_RX_SN for a first plurality of encrypted packets (including the first encrypted packet) received on the first bearer and a second receiving PDCP entity of the first communication device maintains a second variable Next_PDCP_RX_SN for a second plurality of encrypted packets (including the second encrypted packet) received on the second bearer, when the first bearer and the second bearer are associated to the first receiving PDCP entity and the second receiving PDCP entity, respectively.

Figure 10:
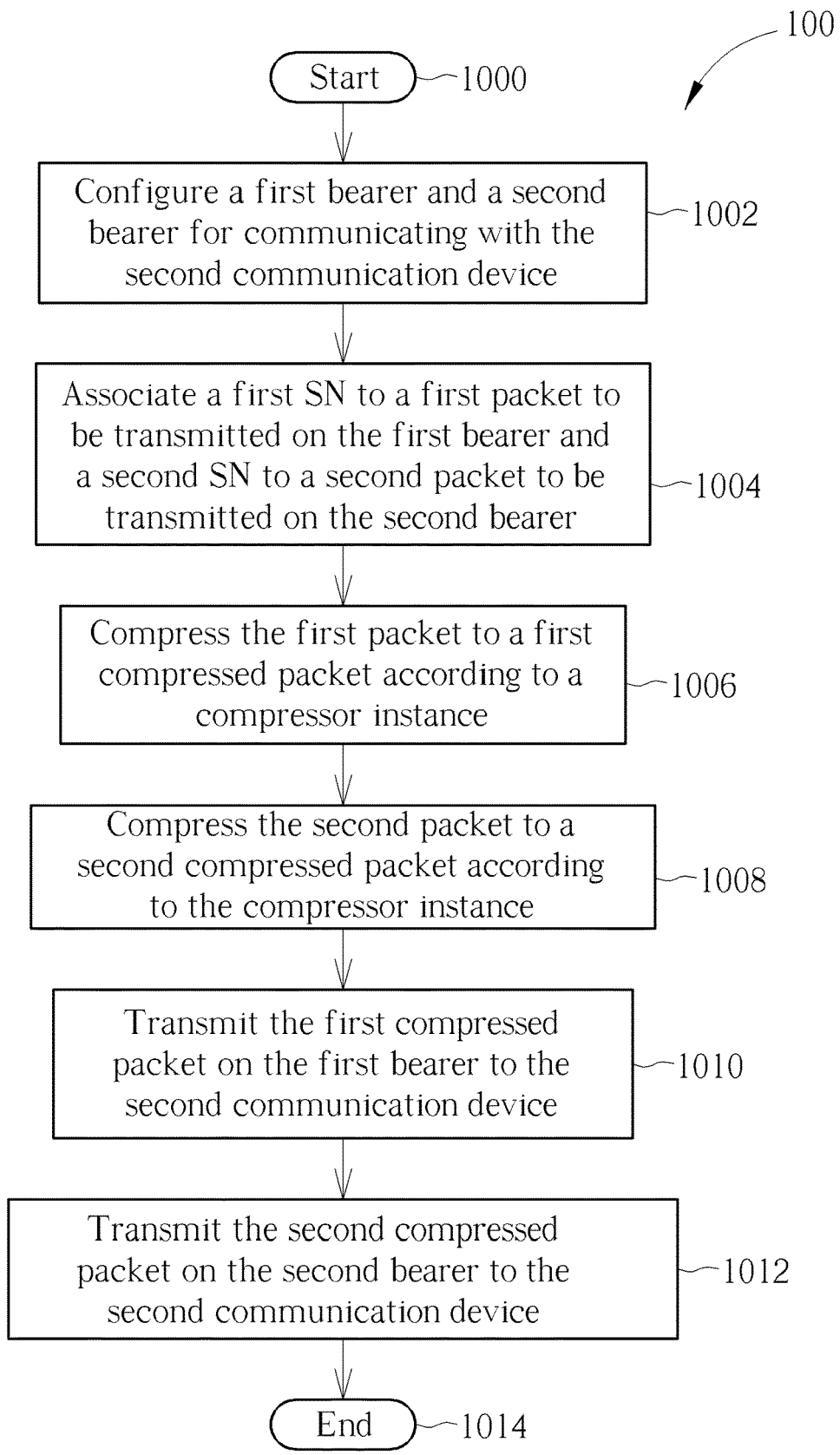
FIG. 10 is a flowchart of a process according to an example of the present invention.

FIG. 10 is a flowchart of a process 100 according to an example of the present invention. The process 100 is utilized in a first communication device, to transmit data to a second communication device and includes the following steps:

Step 1000: Start.
Step 1002: Configure a first bearer and a second bearer for communicating with the second communication device.
Step 1004: Associate a first SN to a first packet to be transmitted on the first bearer and a second SN to a second packet to be transmitted on the second bearer.
Step 1006: Compress the first packet to a first compressed packet according to a compressor instance.
Step 1008: Compress the second packet to a second compressed packet according to the compressor instance.
Step 1010: Transmit the first compressed packet on the first bearer to the second communication device.
Step 1012: Transmit the second compressed packet on the second bearer to the second communication device.
Step 1014: End.

According to the process 100, packets transmitted on the first bearer and the second bearer share the same compression instance in the transmitting PDCP entity of the first communication device, when the first bearer and the second bearer are associated to the transmitting PDCP entity.

Realization of the process 100 is not limited to the above description. The following examples may be applied to the process 100.

In one example, the first communication device compresses the first packet and the second packet according to the ROHC or the data compression protocol as described for the process 30. After the compression, the first communication device encrypts the first compressed packet and the second compressed packet. In one example, the process 100 may be combined with the process 40.

In one example, the first communication device configures the first bearer and the second bearer for communicating with the second communication device. Then, the first communication device compresses a plurality of packets transmitted on two bearers to a plurality of compressed packets according to the same compressor instance, when the two bearers are associated to a flow. The first communication device compresses the plurality of packets transmitted on the two bearers to the plurality of compressed packets according to different compressor instances, when the two bearers are associated to two flows. That is, the number of compressor instances is determined according to the number of flow(s) associated to the two bearers.

In one example, the first communication device compresses a first packet transmitted on the first bearer to a first compressed packet and a second packet transmitted on the second bearer to a second compressed packet according to the same compressor instance, when the first bearer and the second bearer are associated to a flow. After compressing, the first communication device encrypts the first compressed packet and the second compressed packet to a first encrypted packet and a second encrypted packet, respectively (e.g., according to the process 40).

In one example, the first communication device compresses a first packet transmitted on the first bearer to a first compressed packet according to a first compressor instance and compresses a second packet transmitted on the second bearer to a second compressed packet according to a second compressor instance, when the first bearer and the second bearer are associated to two flows. After compressing, the first communication device encrypts the first compressed packet and the second compressed packet to the first encrypted packet and the second encrypted packet, respectively.

Figure 11:
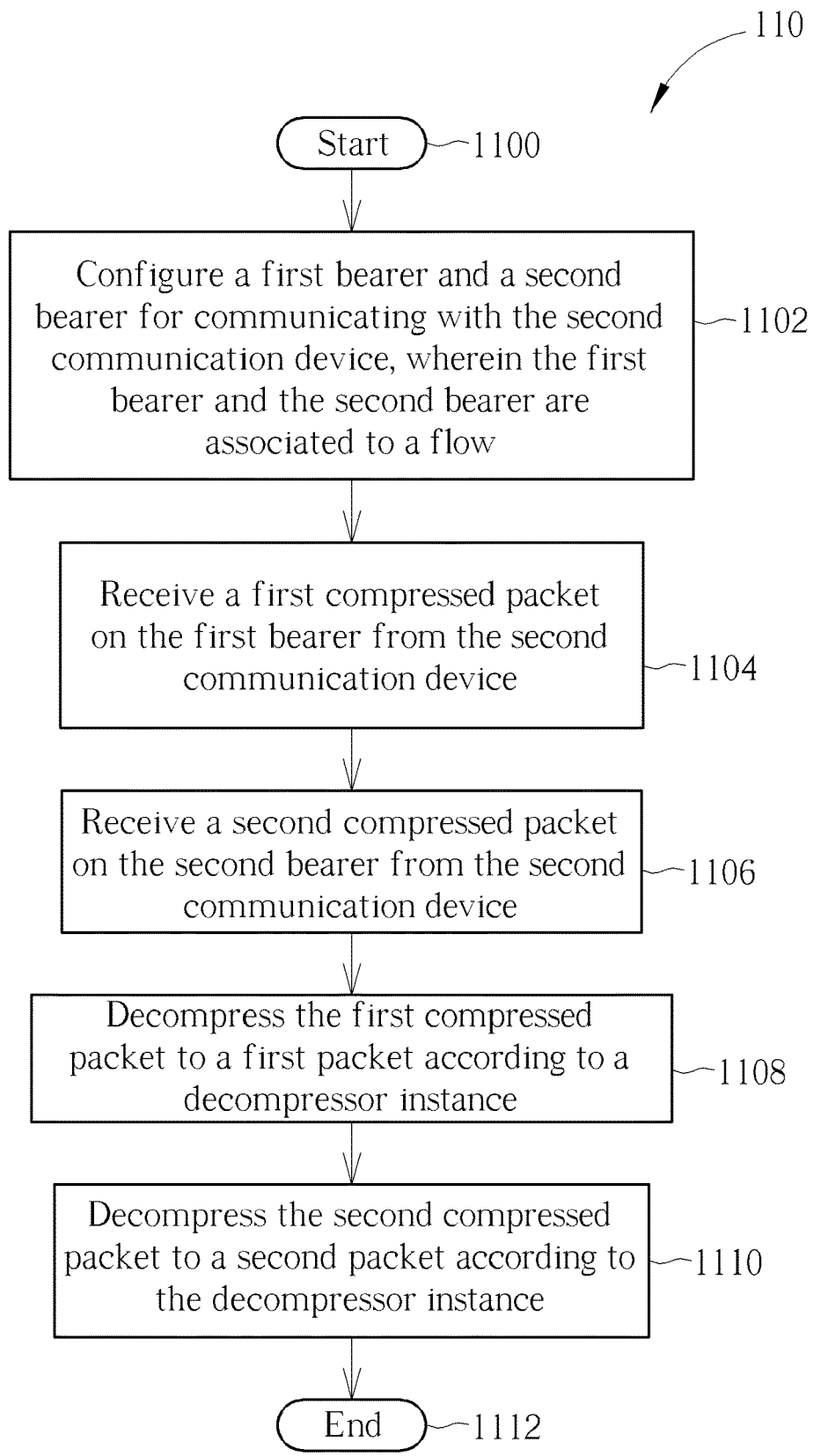
FIG. 11 is a flowchart of a process according to an example of the present invention.

FIG. 11 is a flowchart of a process 110 according to an example of the present invention. The process 110 is utilized in a first communication device, to receive data to a second communication device and includes the following steps:

Step 1100: Start.
Step 1102: Configure a first bearer and a second bearer for communicating with the second communication device, wherein the first bearer and the second bearer are associated to a flow.
Step 1104: Receive a first compressed packet on the first bearer from the second communication device.
Step 1106: Receive a second compressed packet on the second bearer from the second communication device.
Step 1108: Decompress the first compressed packet to a first packet according to a decompressor instance.
Step 1110: Decompress the second compressed packet to a second packet according to the decompressor instance.
Step 1112: End.

According to the process 110, packets received on the first bearer and the second bearer share the same decompression instance, when the first bearer and the second bearer are associated to the flow.

Realization of the process 110 is not limited to the above description. The following examples may be applied to the process 110.

In one example, the first communication device decompresses the first compressed packet and the second compressed packet according to the ROHC or data compression protocol as described in the process 30.

In one example, the first communication device configures the first bearer and the second bearer for communicating with the second communication device. Then, the first communication device decompresses a plurality of compressed packets received on two bearers to a plurality of packets according to the same decompressor instance, when the two bearers are associated to a flow. The first communication device decompresses the plurality of compressed packets received on the two bearers to the plurality of packets according to different decompressor instances, when the two bearers are associated to two flows. That is, the number of decompressor instances is determined according to the number of flow(s) associated to the two bearers.

In one example, the first communication device decompresses a first compressed packet received on the first bearer to a first packet and a second packet received on the second bearer to a second packet according to the same decompressor instance, when the first bearer and the second bearer are associated to a flow.

In one example, the first communication device decompresses a first compressed packet received on the first bearer to a first packet according to a first decompressor instance and decompresses a second packet received on the second bearer to a second packet according to a second decompressor instance, when the first bearer and the second bearer are associated to two flows.

In one example, before decompressing, the first communication device decrypts a first encrypted packet and a second encrypted packet into the first compressed packet and the second compressed packet, respectively (e.g., according to a process described above).

Realization of the processes above is not limited to the above description. Two of the processes above may be combined.

In one example, the first communication device is a UE in FIG. 1 and the second communication device is a network in FIG. 1 (e.g., a BS), or the first communication device is the network in FIG. 1 (e.g., the BS) and the second communication device is the UE in FIG. 1.

In one example, the first communication device configures the first bearer and the second bearer associated to the transmitting PDCP entity or the receiving PDCP entity. In one example, the first communication device configures the first bearer (e.g., a first RB) according to a first configuration (e.g., a first Data RB (DRB) configuration) and the second bearer (e.g., a second RB) according to a second configuration (e.g., a second DRB configuration). In one example, the first configuration includes the first bearer ID of the first bearer and the first LC ID, and the second configuration includes the second bearer ID of the second bearer and the second LC ID. The first communication device (e.g., the network) transmits the first configuration and the second configuration to the second communication device (e.g., the UE). Each of the first configuration and the second configuration may include a RLC configuration. In one example, the first configuration and the second configuration are included in a PDCP configuration which configures the transmitting PDCP entity and/or the receiving PDCP entity. In one example, the first bearer and the second bearer may be same (i.e., same bearer ID) or different (i.e., different bearer IDs).

In one example, a flow is identified by a flow ID, and the two flows is identified by two different flow IDs.

In one example, the first communication device encrypts a plurality of packets of at least one of a IP flow and a quality of service (QoS) flow to a plurality of encrypted packets of a first flow according to the encryption key, a PDCP SN or a COUNT (including the PDCP SN) associated to each of the plurality of encrypted packets, the first bearer ID and a length of each of the plurality of packets. The first communication device transmits the plurality of encrypted packets of the first flow on the first bearer or the second bearer (i.e., via the first RLC entity/the first LC or the second RLC entity/the second LC) in a plurality of PDCP PDUs to the second communication device. Each of the plurality of PDCP PDUs may include an encrypted packet of the plurality of encrypted packets. The second communication device may receive the plurality of PDCP PDUs on the first bearer or the second bearer from the first communication device. The first communication device extracts and decrypts the each of the plurality of encrypted packets of the first flow to a packet according to the encryption key, the PDCP SN or the COUNT (including the PDCP SN) associated to each of the plurality of encrypted packets, the first bearer ID and the length of the each of the plurality of packets of the first flow.

In one example, the network configures the UE to map traffic of the at least one of the IP flow and the QoS flow on the first bearer or the second bearer in the first configuration, the second configuration and/or a third configuration. The UE determines to encrypt the plurality of packets according to the first bearer ID or the second bearer ID and to transmit the plurality of encrypted packets according to the first configuration, the second configuration and/or the third configuration. In one example, the first configuration, the second configuration and/or the third configuration includes at least one flow ID identifying the at least one of the IP flow and the QoS flow.

In one example, the first configuration is included in a first RRC message transmitted by the network to the UE. In one example, the second configuration is included in the first RRC message or in a second RRC message transmitted by the network to the UE. In one example, the third configuration is included in the first RRC message, the second RRC message or a third RRC message transmitted by the network to the UE.

In one example, the first LC and the second LC are associated to the same MAC entity as described above. Alternatively, the first LC and the second LC may be associated to different MAC entities. Thus, RLC PDUs via the first LC and RLC PDUs via the second LC are transmitted by the different MAC entities.

Those skilled in the art should readily make combinations, modifications and/or alterations on the abovementioned description and examples. The abovementioned description, steps and/or processes including suggested steps can be realized by means that could be hardware, software, firmware, an electronic system, or combination thereof. An example of the means may be the communication device 20. Any of the above processes and examples above may be compiled into the program code 214.

To sum up, the present invention provides a method and a communication device for handling mobile data transmissions. A first communication device handles a data transmission of at least two RBs according to a transmitting PDCP entity and handles a data reception of the at least two RBs according to a receiving PDCP entity. Thus, the problem of the mobile data transmissions can be solved.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A first communication device for transmitting data to a second communication device, comprising:
   a storage device; and
   a processing circuit, coupled to the storage device, wherein the storage device stores, and the processing circuit is configured to execute instructions of:
   compressing a first packet to a first compressed packet according to a compressor instance, wherein the first packet is associated to a flow identity (ID);
   generating a first Protocol Data Unit (PDU) comprising the flow ID and the first compressed packet;
   associating a first sequence number (SN) to the first PDU;
   encrypting the first PDU to a first encrypted packet;

generating a first Packet Data Convergence Protocol (PDCP) PDU comprising the first SN and the first encrypted packet;
transmitting the first PDCP PDU via a first logical channel (LC) to the second communication device;
compressing a second packet to a second compressed packet according to the compressor instance, wherein the second packet is associated to the flow ID;
generating a second PDU comprising the flow ID and the second compressed packet;
associating a second SN to the second PDU;
encrypting the second PDU to a second encrypted packet;
generating a second PDCP PDU comprising the second SN and the second encrypted packet; and
transmitting the second PDCP PDU via a second LC to the second communication device.

2. The first communication device of claim 1, wherein the first communication device is a user equipment (UE) and the second communication device is a network, or the first communication device is the network and the second communication device is the UE.

3. The first communication device of claim 1, wherein the storage device further stores the instruction of:
compressing the first packet by compressing a header of the first packet according to a robust header compression protocol (ROHC).

4. The first communication device of claim 1, wherein the storage device further stores the instructions of:
compressing the first packet or a data field of the first packet according to the data compression protocol.

5. The first communication device of claim 1, wherein the storage device further stores the instruction of:
encrypting the first PDU to the first encrypted packet according to a first transmitting PDCP entity and the second PDU to the second encrypted packet according to a second transmitting PDCP entity.

6. A first communication device for transmitting data to a second communication device, comprising:
a storage device; and
a processing circuit, coupled to the storage device, wherein the storage device stores, and the processing circuit is configured to execute instructions of:
configuring a first bearer for communicating with the second communication device;
configuring a first logical channel (LC) and a second LC which are associated to the first bearer for transmitting a plurality of Packet Data Convergence Protocol (PDCP) Protocol Data Units (PDUs) via the first bearer to the second communication device;
associating a first sequence number (SN) to a first packet and a second SN to a second packet, wherein the first SN and the second SN are in a SN space;
encrypting the first packet to a first encrypted packet according to an encryption key, a first bearer ID of the first bearer, a first length of the first packet and the first SN;
encrypting the second packet to a second encrypted packet according to the encryption key, the first bearer ID, a second length of the second packet and the second SN;
transmitting the first encrypted packet on the first LC to the second communication device; and
transmitting the second encrypted packet on the second LC to the second communication device;
wherein the first bearer and the second bearer share a PDCP SN space, wherein a size of the PDCP SN space depends on a length of a PDCP SN.

7. The first communication device of claim 6, wherein the first communication device is a user equipment (UE) and the second communication device is a network, or the first communication device is the network and the second communication device is the UE.

8. The first communication device of claim 6, wherein the storage device further stores the instructions of:
encrypting the first packet to the first encrypted packet according to a 1-bit transmission of direction and a first COUNT value; and
encrypting the second packet to the second encrypted packet according to the 1-bit transmission of direction and a second COUNT value, wherein the first COUNT value consists of a first hyper frame number (HFN) and the first SN, the second COUNT value consists of a second HFN and the second SN, and the first HFN and the second HFN are same or different.

9. The first communication device of claim 6, wherein a transmitting PDCP entity of the first communication device maintains a variable TX_HFN for a first plurality of packets transmitted on the first bearer and a second plurality of packets transmitted on the second bearer, when the first bearer and the second bearer are associated to the transmitting PDCP entity.

10. The first communication device of claim 6, wherein the first bearer and the second bearer are the same.

11. The first communication device of claim 6, wherein the first bearer and the second bearer are different.

12. The first communication device of claim 6, wherein a first transmitting PDCP entity of the first communication device maintains a first variable TX_HFN for a first plurality of packets transmitted on the first bearer and a second transmitting PDCP entity of the first communication device maintains a second variable TX_HFN for a second plurality of packets transmitted on a second bearer, when the first bearer and the second bearer are associated to the first transmitting PDCP entity and the second transmitting PDCP entity, respectively.

13. A first communication device for receiving data from a second communication device, comprising:
a storage device; and
a processing circuit, coupled to the storage device, wherein the storage device stores, and the processing circuit is configured to execute instructions of:
receiving a first logical channel (LC) identity (ID) identifying a first LC and receiving a first Packet Data Convergence Protocol (PDCP) Protocol Data Unit (PDU) comprising a first encrypted packet via the first LC, from the second communication device;
receiving a second LC ID identifying a second LC and receiving a second PDCP PDU comprising a second encrypted packet via the second LC, from the second communication device;
deriving a first bearer ID from the first LC ID and deriving a second bearer ID from the second LC ID;
decrypting the first encrypted packet to a first packet according to an encryption key, a first sequence number (SN) of the first encrypted packet, the first bearer ID, a first length of the first encrypted packet, a 1-bit transmission of direction and a first COUNT value; and
decrypting the second encrypted packet to a second packet according to the encryption key, a second SN of the second encrypted packet, the second bearer ID, a second length of the second encrypted packet, the 1-bit transmission of direction and a second COUNT value;

wherein the first bearer and the second bearer share a PDCP SN space, wherein a size of the PDCP SN space depends on a length of a PDCP SN.

14. The first communication device of claim 13, wherein the first communication device is a user equipment (UE) and the second communication device is a network, or the first communication device is the network and the second communication device is the UE.

15. The first communication device of claim 13, wherein the first COUNT value consists of a first hyper frame number (HFN) and the first SN, the second COUNT value consists of a second HFN and the second SN, and the first HFN and the second HFN are same or different.

16. The first communication device of claim 13, wherein the storage device further stores the instructions of:
configuring a first bearer identified by the first bearer ID and the second bearer identified by the second bearer ID for communicating with the second communication device;
configuring the first LC identified by the first LC ID and associated to the first bearer; and
configuring the second LC identified by the second LC ID and associated to the second bearer.

17. The first communication device of claim 16, wherein a receiving PDCP entity of the first communication device maintains a first variable Next_PDCP_RX_SN for a first plurality of encrypted packets received on the first bearer and a second plurality of encrypted packets received the second bearer, when the first bearer and the second bearer are associated to the receiving PDCP entity.

18. The first communication device of claim 13, wherein the first bearer and the second bearer are the same.

19. The first communication device of claim 13, wherein the first bearer and the second bearer are different.

20. The first communication device of claim 13, wherein a first receiving PDCP entity of the first communication device maintains a first variable Next_PDCP_RX_SN for a first plurality of encrypted packets received on the first bearer and a second receiving PDCP entity of the first communication device maintains a second variable Next_PDCP_RX_SN for a second plurality of encrypted packets received on the second bearer, when the first bearer and the second bearer are associated to the first receiving PDCP entity and the second receiving PDCP entity, respectively.

* * * * *